(12) United States Patent
Aggarwal et al.

(10) Patent No.: US 8,738,387 B2
(45) Date of Patent: May 27, 2014

(54) SYSTEM AND METHOD FOR DETERMINING AN ELEMENT VALUE IN PRIVATE DATASETS

(75) Inventors: Gagan Aggarwal, Stanford, CA (US); Nina Mishra, San Ramon, CA (US); Binyamin Pinkas, Tel Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 3616 days.

(21) Appl. No.: 10/976,558

(22) Filed: Oct. 29, 2004

(65) Prior Publication Data

US 2006/0095378 A1 May 4, 2006

(51) Int. Cl.
*G06Q 10/00* (2012.01)

(52) U.S. Cl.
USPC .......................................... 705/1.1

(58) Field of Classification Search
USPC .......................................... 705/1.1
See application file for complete search history.

(56) References Cited

U.S. PATENT DOCUMENTS 5,615,269 A 3/1997 Micali

OTHER PUBLICATIONS

O. Goldreich et al—"How to Play Any Mental Game"—19th ACM Symposium on Theory of Computing—1987—pp. 218-229.
A.C. Yao—"Protocols for Secure Computations"—23rd Annual IEEE Symposium on Foundations of Computer Science—1982—pp. 160-164.
M. Ben-Or et al—"Completeness Theorems for Non-Cryptographic Fault-Tolerant Distributed Computing"—20th Annual Symposium on the Theory of Computing—1988—pp. 1-10.
D. Chaum et al—"Multiparty Unconditionally Secure Protocols"—20th ACM Symposium on the Theory of Computing—1988—pp. 11-19.

*Primary Examiner* — Carrie Gilkey (57) ABSTRACT

A system and method is disclosed for determining a value of an element, having a k-th rank. The method discloses: calculating a total number of elements in a first and second dataset; prohibiting parties from accessing each other's dataset; ranking the elements within each dataset; computing a total number of elements in the datasets each having a value less than a test value; computing a total number of elements in the datasets each having a value greater than the test value; and setting the value of the element, having the k-th rank, equal to the test value, if the total number of elements having values less than the test value is ≤ the k-th rank minus one, and the total number of elements having values greater than the test value is ≤ the total number of elements minus the k-th rank. The system discloses means for practicing the method.

18 Claims, 5 Drawing Sheets

SYSTEM AND METHOD FOR DETERMINING AN ELEMENT VALUE IN PRIVATE DATASETS

BACKGROUND OF THE INVENTION

1. Field of the Invention

The present invention relates generally to systems and methods for data analysis, and more particularly for determining an element value in private datasets.

2. Discussion of Background Art

Sharing information which by choice or by law is to remain private (i.e. secret) is almost self-contradictory. How can a party share information which is to remain private? One approach to this dilemma is that often parties are willing to share certain statistical information about their own private data. Such statistical data may include, an average value, a median value, a lowest value, a highest value, as well as various other data distribution statistics.

The usefulness of sharing such statistical information while preserving the privacy of the data abound. For example: Suppose that multiple hospitals wish to compute the median life expectancy of patients they treated who had a particular medical ailment (e.g. SARS or HIV). Often by law, hospitals are not permitted to share their detailed personal patient data so that such a median life expectancy could be computed, and yet knowing the median life expectancy would likely be of great value to researchers and government entities tracking the success of combating such a disease.

Similarly, suppose multiple universities wish to compute the median salary of their combined faculty populations so as to better compete for and compensate their faculty. Each university would not like to reveal individual salaries, since pay-scales are determined by length of time in the institution (and so, for example, the minimum salary corresponds to the most junior faculty member and the maximum salary to the most senior). However, computation of the median salary is a basic statistic that various employee organizations and magazines routinely publish.

Current solutions attempt to generate such statistical data from private information by perhaps using a trusted third party; however, the computational and resource overhead required to implement such methods is very burdensome. Also due to the private and sensitive nature of their data, parties may intentionally or unintentionally provide inaccurate data about their private information, thereby further complicating efforts to ensure the accuracy of various statistics computed for such private data.

In response to the concerns discussed above, what is needed is a system and method for secure data analysis that overcomes the problems of the prior art.

SUMMARY OF THE INVENTION

The present invention is a system and method for determining a value [V] of an element, having a k-th rank [k], where [k] is a pre-selected number. The method includes: calculating a total number of elements [T] in a first dataset managed by a first party, and a second dataset managed by a second party; prohibiting each party access to each other's dataset; ranking the elements within each dataset; computing a total number of elements [$\Sigma l_i$] in the datasets each having a value less than a test value [m], without exchanging a number of elements [$l_i$] within each dataset each having a value less than the test value; computing a total number of elements [$\Sigma g_i$] in the datasets each having a value greater than the test value [m], without exchanging a number of elements [$g_i$] within each dataset each having a value greater than the test value; and setting the value [V] of the element, having the k-th rank [k], equal to the test value [m], if the total number of elements having values less than the test value [$\Sigma l_i$] is ≤ the k-th rank [k] minus one, and the total number of elements having values greater than the test value [$\Sigma g_i$] is ≤ the total number of elements [T] minus the k-th rank [k]. The system includes all means for practicing the method.

These and other aspects of the invention will be recognized by those skilled in the art upon review of the detailed description, drawings, and claims set forth below.

DETAILED DESCRIPTION OF THE PREFERRED EMBODIMENT

The present invention describes a secure method for multiple parties to compute the value of a predetermined set of ranked elements in a union of their private datasets. The present invention teaches how to compute such values while preserving the privacy of each party's private dataset information. The present invention also enables parties to generate a histogram of the values in the union of their sets without knowing which party contributed which element values to the histogram data, and includes a set of malicious user verification tests for reporting on any inconsistencies in a party's responses whenever one or more parties do not fully trust each other.

In one exemplary application, a set of hospitals can use the present invention to gain more information about the general patient population (median life expectancy, median white blood cell count, etc) without revealing confidential information about any of their individual patients. In another exemplary application, a set of universities can compute their combined median salary without the cost of a trusted third party, while assuring that nothing beyond the combined median salary is revealed.

The present invention also teaches a different computational technique for securely computing the value of a k-th ranked element while requiring a lower computational overhead than current systems. Such a reduction in overhead increases the calculation's computational speed and thus enables a larger number of parties having larger private datasets to participate in the k-th ranked element computation. So while current methods for finding the k-th ranked element value and handling malicious users are very messy and complicated, the boundary tests and protocol taught by the present invention instead provides a much simpler and cleaner approach.

Figure 1:
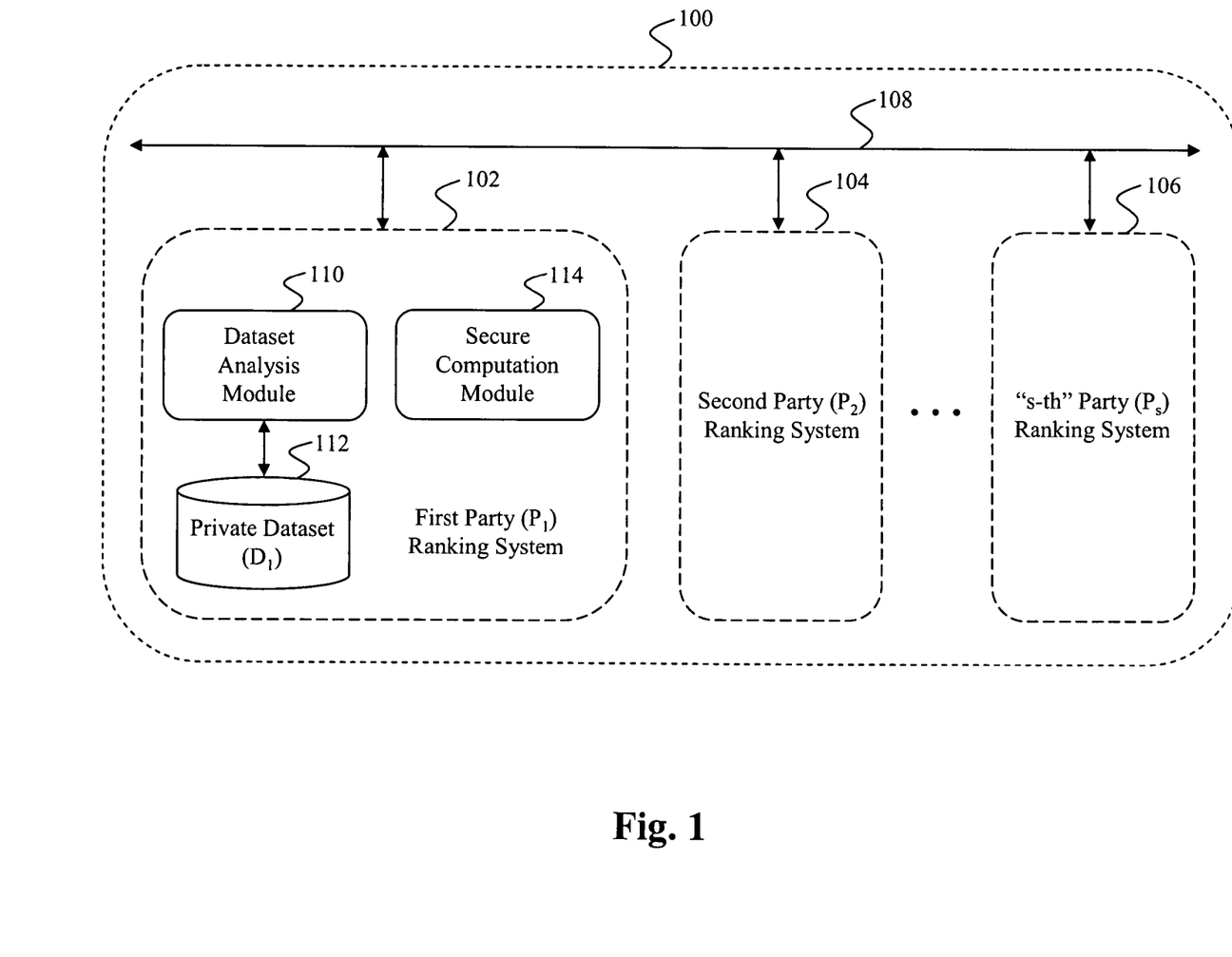
FIG. 1 is one embodiment of a system for determining an element value in private datasets.

FIG. 1 is one embodiment of a system 100 for determining an element value in private datasets. In the system 100, "s" parties (i.e. $P_i$, where $1 \le i \le s$) selectively exchange and analyze information about each others private datasets (i.e. $D_i$, where $1 \le i \le s$). The "s" parties can be any number of parties from as few as two to as many as a computer and network hosting this invention can handle. Parties are herein defined broadly to include not only individuals, but also partially or fully automated systems such as computer databases, separately secure networks, or even lines of code executed in a computer for managing access to the private dataset. The elements in the private datasets preferably include: any type of information about a person, such as a medical history, genetic information, financial information, acquaintance and friendship information, and so on; any type of corporate or government information, such as confidential data, national security information, corporate records, meeting information, and so on. Those skilled in the art recognize that while the present invention is described with respect to the private information managed by a party, the techniques described by the present invention can be applied to information sets which in whole or in part include public information as well.

The system 100 includes a first party ranking system 102, a second party ranking system 104, up through an "s-th" party ranking system 106. The parties 102, 104, and 106 communicate over a network 108. Each of the party ranking systems 102, 104, and 106 preferably include: a dataset analysis module 10, a private dataset 112, and a secure computation module 114. While, the present invention is primarily described with respect to the first party ranking system 102 and its functionality, the present invention is preferably effected in parallel and in a similar manner in all of the other party ranking systems 104 through 106.

The method begins wherein each dataset analysis module 110 in each of the party ranking systems 102, 104, and 106 ($1 \leq i \leq s$), individually and privately analyzes their respective private datasets 112 for the following statistical information: a number of elements $[T_i]$ in the private dataset 112, a minimum value $[\alpha_i]$ of the elements in the dataset 112, and a maximum value $[\beta_i]$ of the elements in the dataset 112. The secure computation module 114 securely sums the number of elements $[T_i]$ in each of the private datasets 112 using a known cryptographic protocol to calculate a combined (i.e. total) number of elements [T] (i.e. $T = \Sigma T_i$, $1 \leq i \leq s$) without revealing each party's individual $[T_i]$ over the network 108.

Such known cryptographic protocols teach how two or more parties (i.e. $P_1 \ldots P_n$, where $n \geq 2$) having private inputs (i.e. $X_1, X_2, \ldots X_n$), can evaluate a given function (i.e. $f(X_1, X_2, \ldots X_n)$) without divulging more information about their private inputs (i.e. $X_1 \ldots X_n$) than is already implicit in the calculated function (i.e. $f(X_1, \ldots, X_n)$) itself. This cryptographic protocol is used in several more computations within the present invention as will be discussed below.

Next, the secure computation module 114 uses a cryptographic protocol to identify a combined minimum value $[\alpha_{MIN}]$ from all of the private dataset minimum values $[\alpha_i]$ (i.e. $[\alpha_{MIN} = MIN(\alpha_i)$, where $1 \leq i \leq s$). The secure computation module 114 identifies a combined maximum value $[\beta_{MAX}]$ from all of the private dataset maximum values $[\beta_i]$ (i.e. $[\beta_{MAX} = MAX(\beta_i)$, where $1 \leq i \leq s$).

The parties 102, 104, and 106 select an element having a k-th rank [k] (i.e. the "k-th ranked element") within the total number of elements [T] whose value [V] is to be determined. Preferably the k-th rank [k] is selected based on a prior agreement between each of the system administrators managing the various party ranking systems 102, 104, and 106.

Those skilled in the art recognize that there are many ways to select the k-th rank [k], such as by negotiations between the various parties 102, 104, and 106. In such a negotiation, the parties 102, 104, and 106 may even agree to use the present invention to securely determine values associated with more than one (e.g., where k is the 25th, 50th, and 75th percentile) or even all of ranked elements in the combined set of private datasets (i.e. k, where k ranges from 1 to T) so that a histogram of the values associated with the various elements in [T] may be generated. Which individual element value came from which private dataset 112, however, would still remains private. In other instances of the present invention a system administrator for one or more of the party ranking systems may only agree to help calculate one of the ranked elements.

The dataset analysis module 10, within each of the party ranking systems 102, 104, and 106, securely sorts the elements within their own private dataset 112 according to the element's respective values [v] in ascending order (i.e. from $[\alpha_i]$ to $[\beta_i]$ respectively). Those skilled in the art however will recognize that there are many ways to "rank" data and not all of them are based on an element's value. Other ranking approaches may be based on some other attribute of the dataset elements, such as a date and time when an element was entered into the private dataset.

Figure 2:
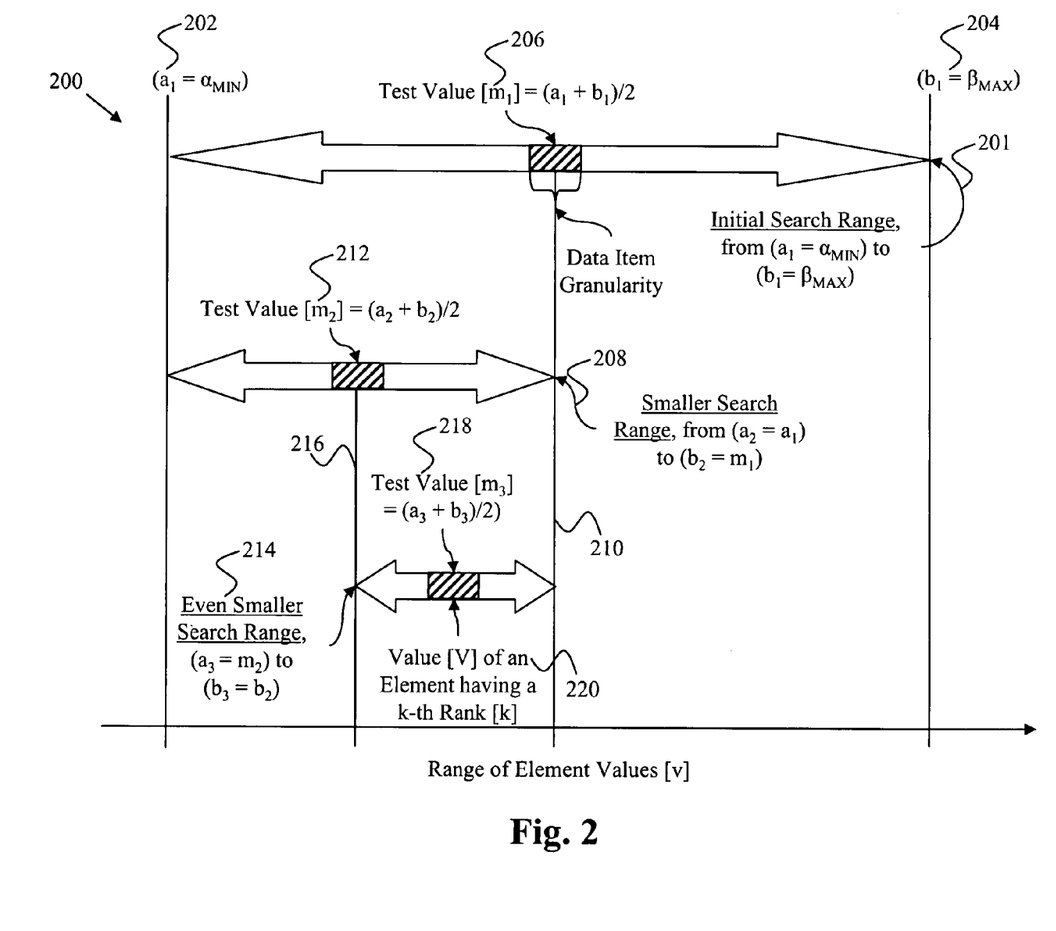
FIG. 2 is one pictorial embodiment of the system in operation.

FIG. 2 is one pictorial embodiment 200 of the one embodiment of the system 100 in operation and reference is made to this Figure in the discussion that immediately follows for illustrative purposes. The secure computation module 114, within each of the party ranking systems 102, 104, and 106, defines a search range 201 from $[a_1 = \alpha_{MIN}]$ 202 to $[b_1 = \beta_{MAX}]$ 204. The secure computation module 114 sets a test value $[m_1]$ 206 for the k-th ranked element value [V] equal to some value within the search range 201. Preferably, this test value $[m_1]$ 206 is defined as the mid-point between $[a_1]$ and $[b_1]$ (i.e. $m_1 = (\alpha_{MIN} + \beta_{MAX})/2$). The test value $[m_1]$ 206, and all subsequent test values, are preferably defined as the mid-point so that the range is repeatedly halved with each computation for maximum computational speed. However, other embodiments of the present invention can set the test values [m] equal to any value within the search range.

The secure computation module 114 within the first party ranking system 102 announces the test value $[m_1]$ 206 to all of the parties 104 through 106. However, in an alternate embodiment, $[m_1]$ can be implicitly computed by each of the parties.

Each of the parties 102, 104, through 106 individually compute in a privacy-preserving manner (i.e. each party keeps the exact values of their dataset elements secret) a number of elements $[l_i]$ in their private dataset 112 whose elements have a value [v] that is less than the test value $[m_1]$ 206. Each of the parties 102, 104, through 106 also computes in a privacy-preserving manner a number of elements $[g_i]$ in its private dataset 112 whose elements have a value [v] that is greater than the test value $[m_1]$ 206, where $[l_i]$ and $[g_i]$ are integers.

Note that in some applications of the present invention, the system administrator for one or more of the parties 102, 104, and 106 may not completely trust information provided by one or more of the other parties (e.g. the system administrator thinks that some of the other parties may be either intentionally or unintentionally providing inaccurate information about the information in their private dataset 112 or not following the present invention's computational protocol). Those parties with such concerns preferably implement a set of verification tests which ensure that the parties 102, 104, and 106 provide consistent inputs, over the course of the method as the search range shrinks.

While the extra functionality is discussed as if only the first party 102 does not trust the second party $[P_{i=2}]$, those skilled in the art recognize that any of the parties may selectively implement such extra protective functionality with respect to more than one, or even all, of the other parties (i.e. $P_i$ where $1 \leq i \leq s$)

If the first party 102 is concerned that the second party's $[P_{i=2}]$ 104 information may be inaccurate, the secure computation module 114 defines for the second party 104 a lower verification boundary $[(l)^{i=2}]$ (relabeled as $B_L$ in the claims)

for checking the validity of the $[l_{i=2}]$ values provided by the second party 104, and a greater verification boundary $[(g)^{i=2}]$ (relabeled as $B_G$ in the claims) for checking the validity of the $[g_{i=2}]$ values provided by the second party 104. $(l)^{i=2}$ denotes a number of elements the second party possesses that are strictly smaller than the current search range, and $(g)^{i=2}$ denotes a number of elements the second party possesses that are strictly larger than the current search range. Since the search range shrinks as the method executes, both $(l)^{i=2}$ and $(g)^{i=2}$ increase as the method executes. These first and second boundaries are initially set to zero (i.e. $(l)^{i=2}=0$ and $(g)^{i=2}=0$) but are later revised as the k-th element value [V] identification process continues as described below.

If the first party 102 is concerned that the second party's 104 information may be inaccurate, the secure computation module 114 within the first party ranking system 102 uses a cryptographic protocol to verify that the number of elements reported by the second party 104 as less than the test value $[m_1]$ (i.e. $l_{i=2}$) plus the number of elements reported by the second party 104 as greater than the test value $[m_1]$ (i.e. $g_{i=2}$), does not exceed the number of elements $[T_{i=2}]$ the second party reported as being in their private dataset $(D_{i=2})$ (i.e. $l_{i=2}+g_{i=2} \le T_{i=2}$).

As introduced above, the cryptographic protocol enables the secure computation module 114 to perform this computation without the second party 104 (or any other party) having to reveal its private $l_i$ and $g_i$ values. In one embodiment, the cryptographic protocol used to perform the verification uses a secure function [h] that preferably outputs a logical "true" if the second party 104 fails the verification test, and "false" if the second party 104 passes the verification test.

Continuing, if the first party 102 is concerned that the second party's 104 information may be inaccurate, the secure computation module 114 for the first party 102 also uses a cryptographic protocol to verify that the number of elements the second party 104 reported as less than the test value $[m_1]$ (i.e. $l_{i=2}$), is greater than or equal to the first boundary $[(l)^{i=2}]$ (i.e. $l_{i=2} \ge (l)^{i=2}$).

If the first party 102 is concerned that the second party's 104 information may be inaccurate, the secure computation module 114 for the first party 102 uses a cryptographic protocol to verify that the number of elements the second party 104 reported as greater than the test value $[m_1]$ (i.e. $g_{i=2}$), is greater than or equal to the second boundary $[(g)^{i=2}]$ (i.e. $g_{i=2} \ge (g)^{i=2}$).

If any one of the three verification tests fail, the secure computation module 114 announces on the network 108 that the second party 104 has provided inaccurate information and stops all processing within the system 100 (i.e. aborts the k-th element value calculation). In an alternate embodiment, the system 100 can reinitialize the k-th element value calculation, but this time the remaining parties exclude the second party's 104 data from the calculation.

If a sum total number of elements reported by all parties 102, 104, and 106 as less than the test value (i.e. $\Sigma l_i$, where $1 \le i \le s$) is less than or equal to the k-th rank [k] minus one (i.e. $\Sigma l_i \le k-1$); and, a sum total number of elements reported by all parties as greater than the test value (i.e. $\Sigma g_i$, where $1 \le i \le s$) is less than or equal to the total number of elements [T] minus the k-th rank [k] (i.e. $\Sigma g_i \le T-k$), then the secure computation module 114 sets value [V] of the element having the k-th rank [k] equal to the test value $[m_1]$ and sets a control variable equal to "done". The secure computation module 114 preferably performs this summation (i.e. $\Sigma l_i$ and $\Sigma g_i$), and the summations to follow, using a cryptographic protocol which preserves the privacy of each party's individual $l_i$ and $g_i$ values.

If the sum total number of elements reported by all of the parties 102, 104, 106 as less than the test value (i.e. $\Sigma l_i$) is itself greater than or equal to the k-th rank [k] (i.e. $\Sigma l_i \ge k$), then the value [V] of the k-th ranked element has not been found, but is instead equal to something lower than the test value $[m_1]$, and so the secure computation module 114 defines a smaller search range 208 from $[a_2=a_1]$ 202 to $[b_2=m_1]$ 210 and sets the control variable to "not done". The smaller search range's 208 upper limit $[b_2]$ has been reduced to the test value $[m_1]$ since the value [V] of the k-th ranked element is equal to something less than the test value $[m_1]$.

If the first party 102 is concerned that information provided by party 104 may be inaccurate, the secure computation module 114 uses a cryptographic protocol to set the second boundary $[(g)^{i=2}]$ equal to the second party's 104 reported private dataset size $[T_{i=2}]$ minus the total number of elements the second party 104 reported as less than the test value $[m_1]$ (i.e. $(g)^{i=2}=T_{i=2}-l_{i=2}$). Note that as the upper limit $[b_2]$ of the search range decreases, $[(g)^{i=2}]$ is non-decreasing. This can be seen by noting that $[T_{i=2}-l_{i=2} \ge g_{i=2}]$, which is enforced to be at least as much as the previous value of $[(g)^{i=2}]$, while the lower limit $[a_2]$ of the search range remains the same, and thus $[(l)^{i=2}]$ is not increased.

If the sum total number of elements reported by all of the parties 102, 104, 106 as greater than the test value (i.e. $\Sigma g_i$) is itself greater than or equal to T-k+1 (i.e. $\Sigma g_i \ge T-k+1$), then the value [V] of the element having the k-th rank [k] also has not been found, but is instead equal to something more than the test value $[m_1]$, and so the secure computation module 114 increases the lower limit $[a_2]$ of the search range to the test value $[m_1]$ and sets the control variable to "not done". The search range's lower limit would be increased since the value [V] of the k-th ranked element is equal to something greater than the test value $[m_1]$.

Note that FIG. 2 does not show this modification to the smaller search range 208 since in the example shown in FIG. 2 the value [V] of the element having the k-th rank [k] is presumed to be less than the test value $[m_1]$. However, such a modification is shown in FIG. 2 wherein, after analyzing the element values within the smaller search range 208 with respect to the test value $[m_2]$ 212, the value [V] of the k-th ranked element is found to be greater than the test value $[m_2]$ 212, in which case the secure computation module 114 defines an even smaller search range 214 from $[a_3=m_2]$ 216 to $[b_3=b_2]$ 210 and sets the control variable to "not done".

If the first party 102 is concerned that information provided by party 104 may be inaccurate, the secure computation module 114 uses a cryptographic protocol to set the first boundary $[(l)^{i=2}]$ equal to the second party's 104 reported private dataset size $[T_{i=2}]$ minus the total number of elements $[g_{i=2}]$ the second party 104 reported as greater than the test value $[m_1]$ (i.e. $(l)^{i=2}=T_{i=2}-g_{i=2}$). Note that as the lower limit $[a_3]$ of the search range increases, $[(l)^{i=2}]$ is non-decreasing. This can be seen by noting that $[T_{i=2}-g_{i=2} \ge l_{i=2}]$, which is enforced to be at least as much as the previous value of $[(l)^{i=2}]$, while the upper limit $[a_3]$ of the search range remains the same, and thus $[(g)^{i=2}]$ is not increased.

If the control variable is set to "done" then the method ends. If the control variable is set to "not done" then element values within one of the smaller search ranges are analyzed again, but this time using a different test value (e.g. $[m_2]$ 212, $[m_3]$ 218, and so on).

Through this iterative process, eventually the lower and upper limits zero in on the value [V] of the k-th ranked element 220, since $\Sigma l_i \le k-1$, and $\Sigma g_i \le T-k$, where $1 \le i \le s$, as described above. This value [V] of the k-th ranked element 220 will be accurate even if multiple elements within the private datasets 112 have this same value [V].

Figure 3:
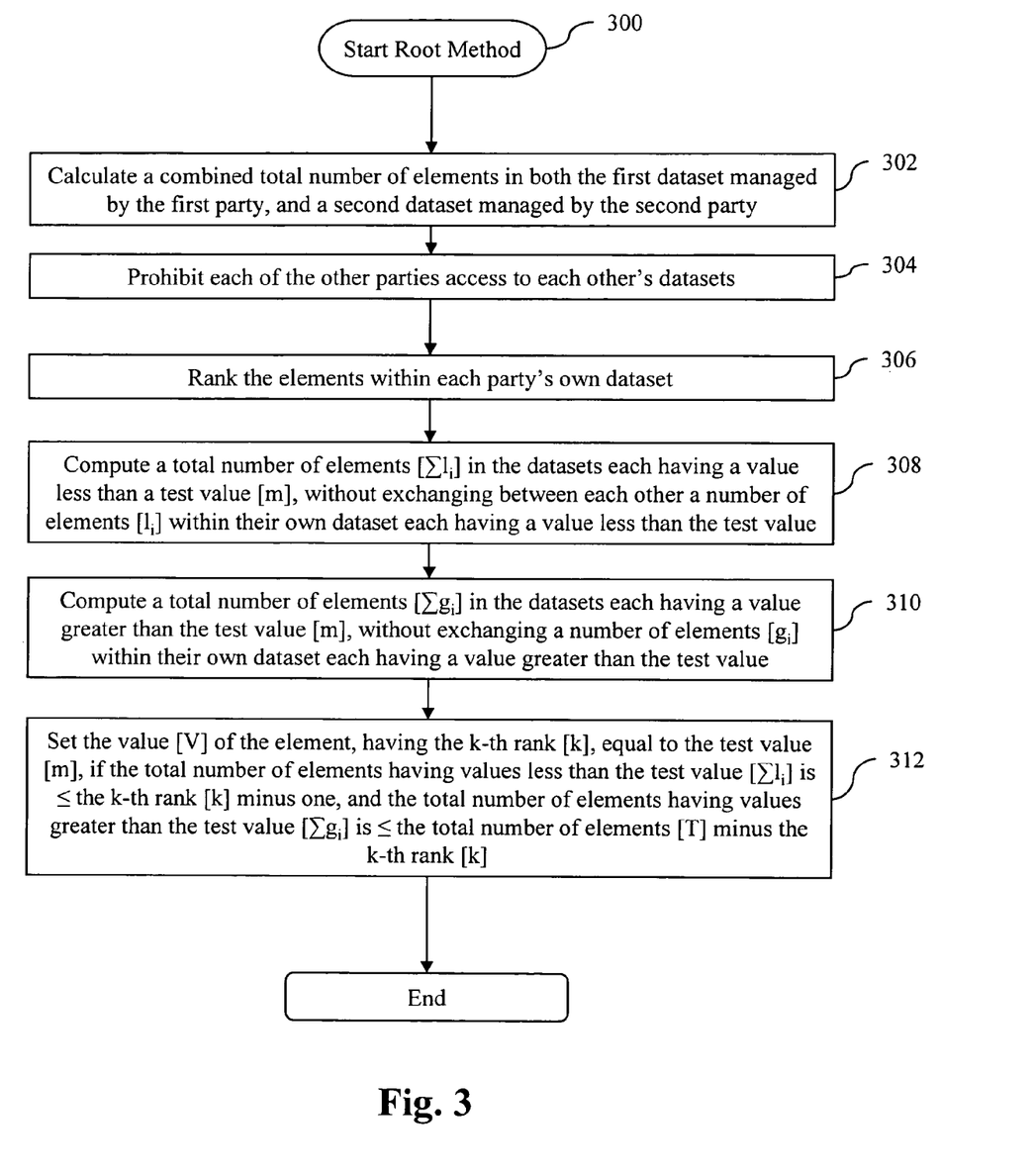
FIG. 3 is a flowchart of one embodiment of a root method for determining an element value in private datasets.

FIG. 3 is a flowchart of one embodiment of a root method 300 for determining an element value in private datasets. The root method 300 determines a value [V] of an element having a k-th rank [k], where [k] is a pre-selected number. In step 302, the dataset analysis module 110 in cooperation with the secure computation module 114 calculates a combined total number of elements [T=$\Sigma T_i$] in both the first dataset 112 managed by the first party 102, and a second dataset managed by the second party 104. In step 304, each of the parties 102 and 104 prohibit each of the other parties access to each other's own datasets. In step 306, each party's dataset analysis module 110 ranks the elements within each party's own dataset. In step 308, each party's secure computation module 114 computes a total number of elements [$\Sigma l_i$] in the datasets each having a value less than a test value [m], without exchanging between each other a number of elements [$l_i$] within their own dataset each having a value less than the test value. In step 310, the secure computation module 114 computes a total number of elements $\Sigma g_i$ in the datasets each having a value greater than the test value [m], without exchanging a number of elements [$g_i$] within their own dataset each having a value greater than the test value. Then in step 312, the secure computation module 114 sets the value [V] of the element, having the k-th rank [k], equal to the test value [m], if the total number of elements having values less than the test value [$\Sigma l_i$] is ≤ the k-th rank [k] minus one, and the total number of elements having values greater than the test value [$\Sigma g_i$] is ≤ the total number of elements [T] minus the k-th rank [k]. The root method 300 is discussed in further detail with respect to FIG. 4.

Figure 4A:
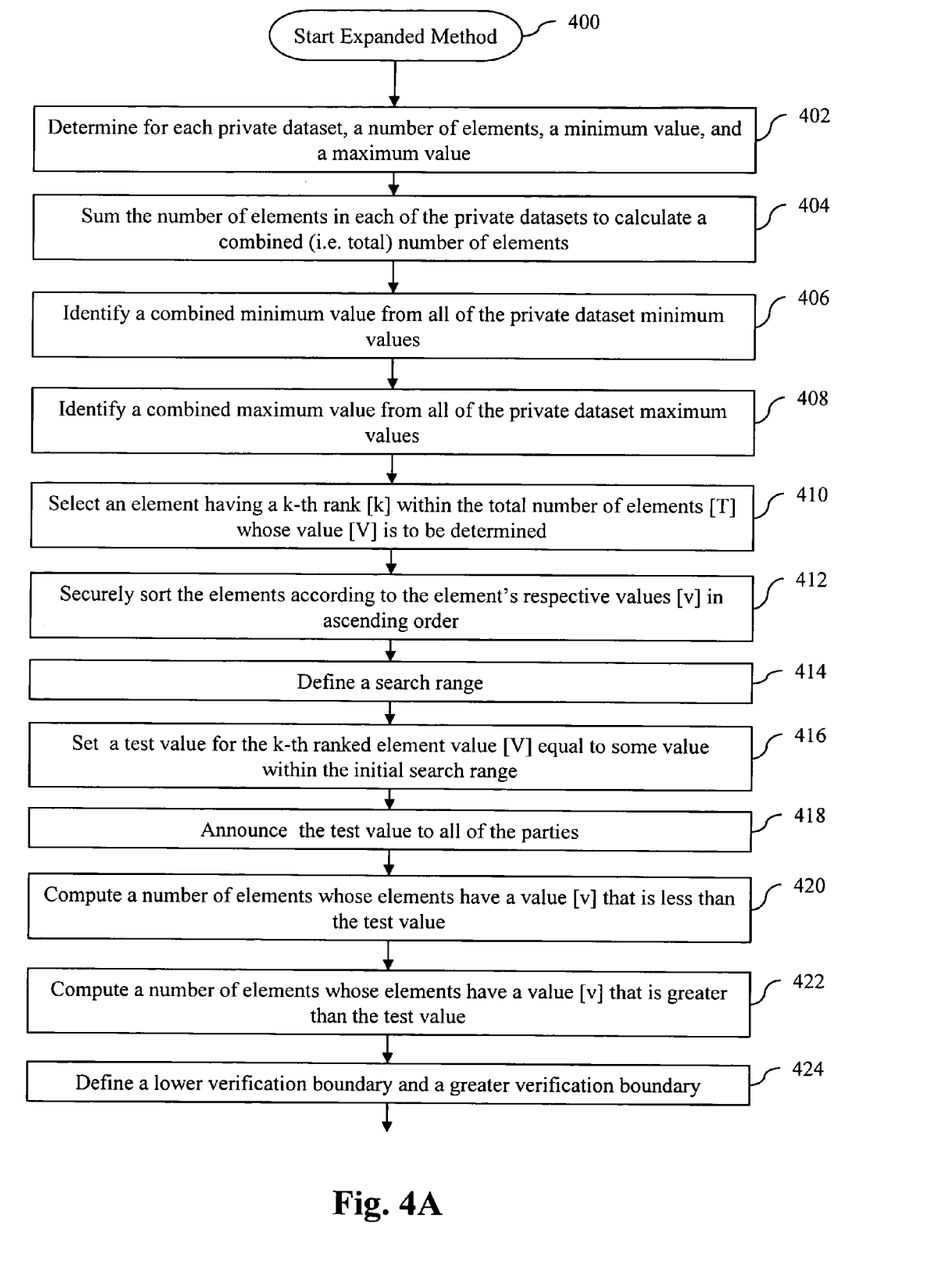
FIG. 4 is a flowchart of one expanded embodiment of the root method.
Figure 4B:
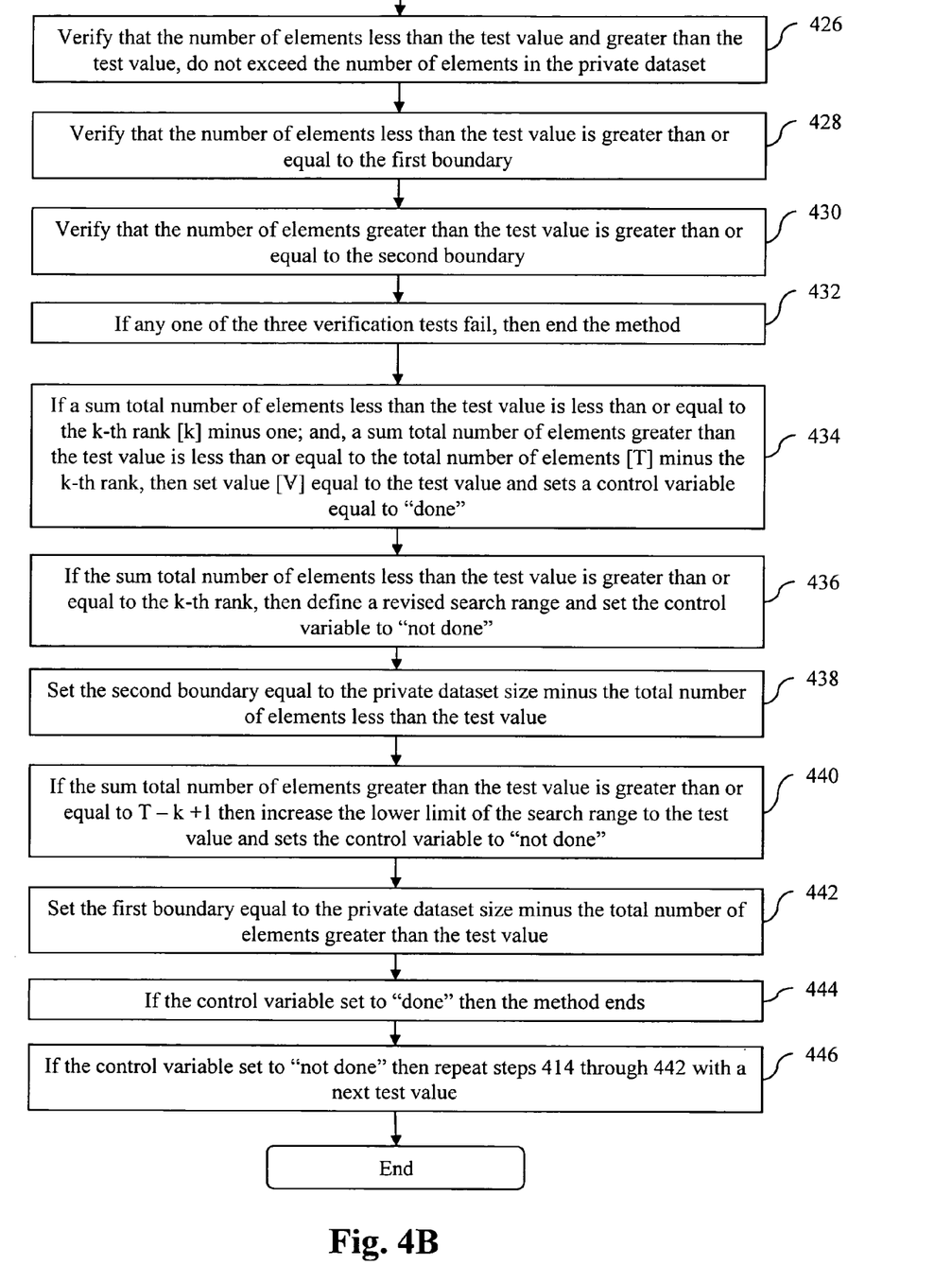

FIG. 4 is a flowchart of one expanded embodiment 400 of the root method 300. The expanded method 400 begins, in step 402, wherein each dataset analysis module 110 in the party ranking systems 102, 104, and 106 (1≤i≤s), individually and privately analyzes their respective private datasets 112 for the following statistical information: a number of elements [$T_i$] in the private dataset 112, a minimum value [$\alpha_i$] of the elements in the dataset 112, and a maximum value [$\beta_i$] of the elements in the dataset 112. In step 404, the secure computation module 114 uses a cryptographic protocol to sum the number of elements [$T_i$] in each of the private datasets 112 to calculate a combined (i.e. total) number of elements [T] (i.e. T=$\Sigma T_i$, 1≤i≤s).

In step 406, the secure computation module 114 uses a cryptographic protocol to identify a combined minimum value [$\alpha_{MIN}$] from all of the private dataset minimum values [$\alpha_i$] (i.e. [$\alpha_{MIN}$=MIN($\alpha_i$), where 1≤i≤s). In step 408, the secure computation module 114 uses a cryptographic protocol to identify a combined maximum value [$\beta_{MAX}$] from all of the private dataset maximum values [$\beta_i$] (i.e. [$\beta_{MAX}$=MAX ($\beta_i$), where 1≤i≤s).

In step 410, the parties 102, 104, and 106 select an element having a k-th rank [k] (i.e. the "k-th ranked element") within the total number of elements [T] whose value [V] is to be determined. In step 412, the dataset analysis module 110, within each of the party ranking systems 102, 104, and 106, securely sorts the elements within their own private dataset 112 according to the element's respective values [v] in ascending order (i.e. from [$\alpha_i$] to [$\beta_i$] respectively). In step 414, the secure computation module 114, within each of the party ranking systems 102, 104, and 106, defines an initial search range 201 from [$a_1$=$\alpha_{MIN}$] 202 to [$b_1$=$\beta_{MAX}$] 204. In step 416, the secure computation module 114 sets a test value [$m_1$] 206 for the k-th ranked element value [V] equal to some value within the initial search range 201. In step 418, the secure computation module 114 within the first party ranking system 102 announces the test value [$m_1$] 206 to all of the parties 104 through 106.

In step 420, each of the parties 102, 104, through 106 compute in a privacy-preserving manner a number of elements [$l_i$] in its private dataset 112 whose elements have a value [v] that is less than the test value [$m_1$] 206. In step 422, each of the parties 102, 104, through 106 computes in a privacy-preserving manner a number of elements [$g_i$] in its private dataset 112 whose elements have a value [v] that is greater than the test value [$m_1$] 206, where [$l_i$] and [$g_i$] are integers.

In step 424, if the first party 102 is concerned that the second party's [$P_{i=2}$] 104 information may be inaccurate, the secure computation module 114 defines for the second party 104 a lower verification boundary [$(l)^{i=2}$] for checking the validity of the [$l_{i=2}$] values provided by the second party 104, and a greater verification boundary [$(g)^{i=2}$] for checking the validity of the [$g_{i=2}$] values provided by the second party 104.

In step 426, if the first party 102 is concerned that the second party's 104 information may be inaccurate, the secure computation module 114 within the first party ranking system 102 uses a cryptographic protocol to verify that the number of elements reported by the second party 104 as less than the test value [$m_1$] (i.e. $l_{i=2}$) plus the number of elements reported by the second party 104 as greater than the test value [$m_1$] (i.e. $g_{i=2}$), does not exceed the number of elements [$T_{i=2}$] the second party reported as being in their private dataset ($D_{i=2}$) (i.e. $l_{i=2}$+$g_{i=2}$≤$T_{i=2}$).

In step 428, if the first party 102 is concerned that the second party's 104 information may be inaccurate, the secure computation module 114 for the first party 102 also uses a cryptographic protocol to verify that the number of elements the second party 104 reported as less than the test value [$m_1$] (i.e. $l_{i=2}$), is greater than or equal to the first boundary [$(l)^{i=2}$] (i.e. $l_{i=2}$≥$(l)^{i=2}$).

In step 430, if the first party 102 is concerned that the second party's 104 information may be inaccurate, the secure computation module 114 for the first party 102 uses a cryptographic protocol to verify that the number of elements the second party 104 reported as greater than the test value [$m_1$] (i.e. $g_{i=2}$), is greater than or equal to the second boundary [$(g)^{i=2}$] (i.e. $g_{i=2}$≥$(g)^{i=2}$).

In step 432, if any one of the three verification tests (i.e. steps 426, 428, and 430) fail, the secure computation module 114 announces on the network 108 that the second party 104 has provided inaccurate information and stops all processing within the system 100, after which the method 400 ends.

In step 434, if a sum total number of elements reported by all parties 102, 104, and 106 as less than the test value [$m_1$] (i.e. $\Sigma l_i$, where 1≤i≤s) is less than or equal to the k-th rank [k] minus one (i.e. $\Sigma l_i$≤k−1, where 1≤i≤s); and, a sum total number of elements reported by all parties as greater than the test value [$m_1$] (i.e. $\Sigma g_i$, where 1≤i≤s) is less than or equal to the total number of elements [T] minus the k-th rank [k] (i.e. $\Sigma g_i$≤T−k, where 1≤i≤s), then the secure computation module 114 sets value [V] of the element having the k-th rank [k] equal to the test value [$m_1$] and sets a control variable equal to "done".

In step 436, if the sum total number of elements reported by all of the parties 102, 104, and 106 as less than the test value [$m_1$] (i.e. $\Sigma l_i$, where 1≤i≤s) is greater than or equal to the k-th rank [k] (i.e. $\Sigma l_i$≥k), then the value [V] of the k-th ranked element has not been found, but is instead equal to something less than the test value [$m_1$], and so the secure computation module 114 defines a revised search range 208 from $[a_2=a_1]$ 202 to $[b_2=m_1]$ 210 and sets the control variable to "not done".

In step 438, if the first party 102 is concerned that information provided in step 436 by party 104 may be inaccurate, the secure computation module 114 uses a cryptographic protocol to set the second boundary $[(g)^{i=2}]$ equal to the second party's 104 reported private dataset size $[T_{i=2}]$ minus the total number of elements the second party 104 reported as less than the test value $[m_1]$ (i.e. $(g)^{i=2}=T_{i=2}-l_{i=2}$).

In step 440, if the sum total number of elements reported by all of the parties 102, 104, and 106 as greater than the test value $[m_1]$ (i.e. $\Sigma g_i$, where $1 \leq i \leq s$) is greater than or equal to T−k+1 (i.e. $\Sigma g_i \geq T-k+1$, where $1 \leq i \leq s$), then the value [V] of the element having the k-th rank [k] also has not been found, but is instead equal to something greater than the test value $[m_1]$, and so the secure computation module 114 increases the lower limit $[a_2]$ of the revised search range 208 to the test value $[m_1]$ and sets the control variable to "not done".

In step 442, if the first party 102 is concerned that information provided in step 440 by party 104 may be inaccurate, the secure computation module 114 uses a cryptographic protocol to set the first boundary $[(l)^{i=2}]$ equal to the second party's 104 reported private dataset size $[T_{i=2}]$ minus the total number of elements $[g_{i=2}]$ the second party 104 reported as greater than the test value $[m_1]$ (i.e. $(l)^{i=2}=T_{i=2}-g_{i=2}$).

In step 444, if the control variable is set to "done" then the method ends. In step 446, if the control variable is set to "not done" then steps 414 through 442 are repeated, but this time with a next test value (e.g. $[m_2]$ 212, $[m_3]$ 218, and so on) and a new search range (e.g. revised search range 208, revised search range 214, and so on).

While one or more embodiments of the present invention have been described, those skilled in the art will recognize that various modifications may be made. Variations upon and modifications to these embodiments are provided by the present invention, which is limited only by the following claims.

What is claimed is:

1. A method for determining a value of an element, having a k-th rank, where k is a pre-selected number, comprising:
using a first computer to calculate a combined total number of elements in a first dataset managed by a first party and using a second computer to calculate a total number of elements in a second dataset managed by a second party;
prohibiting each party access to each other's dataset;
ranking the elements within each dataset;
using the first computer to compute a total number of elements in the first dataset having a value less than a test value and using the second computer to compute a total number of elements in the second dataset having a value less than the test value without exchanging a number of elements with each data between the two computers;
using the first computer to compute a total number of elements in the first dataset having a value greater than the test value and using the second computer to compute a total number of elements in the second dataset having a value greater than the test value; and
for each of the first and second computers, using the computer to set the value of the element, having the k-th rank, equal to the test value, if the total number of elements having values less than the test value is ≤ the k-th rank minus one, and the total number of elements having values greater than the test value is ≤ the total number of elements minus the k-th rank.

2. The method of claim 1:
wherein the acts of using the first and second computers comprises computing using a cryptographic protocol.

3. The method of claim 1:
wherein ranking includes ranking the elements in order of their respective values.

4. The method of claim 1, further comprising:
defining a search range having a lower limit and an upper limit;
setting the upper limit of the search range equal to the test value, if the total number of elements having values less than the test value is greater than or equal to the k-th rank;
selecting a next test value from within the search range; and
repeating using the first and second computers to compute and set using the next test value.

5. The method of claim 1, further comprising:
defining a search range having a lower limit and an upper limit;
setting the lower limit of the search range to the test value, if the total number of elements having values greater than the test value is ≥ the total number of elements minus the k-th rank plus one;
selecting a next test value from within the search range; and
repeating using the first and second computers to compute and set using the next test value.

6. The method of claim 1, further comprising:
identifying a minimum element value from the datasets;
identifying a maximum element value from the datasets;
defining a search range having a lower limit and an upper limit;
initializing the lower limit to the minimum element value and the upper limit to the maximum element value; and
selecting the test value from within the search range.

7. The method of claim 1, further comprising:
defining a search range having a lower limit and an upper limit; and
setting the test value equal to an average of the upper limit and the lower limit.

8. The method of claim 1, further comprising:
verifying with respect to the second party that the number of elements having values less than the test value plus the number of elements having values greater than the test value, does not exceed the total number of elements.

9. The method of claim 1, further comprising:
setting a lower verification boundary equal to a total number of elements in the second dataset minus the number of elements in the second data set having values greater than the test value;
setting a greater verification boundary equal to the total number of elements in the second dataset minus the number of elements in the second dataset having values less than the test value;
verifying that the number of elements in the second dataset having values less than the test value is greater than or equal to the lower verification boundary; and
verifying that the number of elements in the second dataset having values greater than the test value, is greater than or equal to the greater verification boundary.

10. The method of claim 9, further comprising:
initializing both the lower verification boundary and the greater verification boundary to zero.

11. The method of claim 1:
wherein the act of using the first and second computers to calculate comprises calculating includes totaling the number of elements in multiple datasets managed by multiple parties.

12. A method for determining a value of an [V] element, having a k-th rank [k], where [k] is a pre-selected number, comprising:
  using a first computer to calculate a total number of elements [T] in a first dataset managed by a first party and using a second computer to calculate a total number of elements in a second dataset managed by a second party;
  prohibiting each party access to each other's dataset;
  ranking the elements within each dataset;
  defining a search range having a lower limit and an upper limit;
  selecting a test value [m] from within the search range;
  using the first computer to compute a total number of elements [$\Sigma l_i$] in the first dataset each having a value less than the test value [m] and using the second computer to compute a total number of elements [$g_i$] in the second dataset having a value less than the test value without exchanging a number of elements [$l_i$] with each dataset between the two computers;
  using the first computer to compute a total number of elements [$\Sigma g_i$] in the first dataset having a value greater than the test value [m] and using the second computer to compute a total number of elements in the second dataset having a value greater than the test value;
  for each of the first and second computers, using the computer to set the value [V] of the element, having the k-th rank [k], equal to the test value [m], if the total number of elements having values less than the test value [$\Sigma l_i$] is ≤ the k-th rank [k] minus one, and the total number of elements having values greater than the test value [$\Sigma g_i$] is ≤ the total number of elements [T] minus the k-th rank [k]; setting the upper limit of the search range equal to the test value [m], if the total number of elements having values less than [$\Sigma l_i$] the test value [m] is greater than or equal to the k-th rank [k];
  setting the lower limit of the search range to the test value [m], if the total number of elements having values greater than [$\Sigma g_i$] the test value [m] is ≥ the total number of elements [T] minus the k-th rank [k] plus one;
  selecting a next test value from within the search range; and
  repeating the computing and setting steps using the next test value.

13. An article comprising at least one non-transitory computer-readable storage medium storing instructions that when executed by first and second computers, cause the first and second computers to determine a value [V] of an element, having a k-th rank [k], where [k] is a pre-selected number, the determination of the value [V] of the element comprising:
  using the first computer to calculate a total number of elements [T] in a first dataset managed by a first party and using the second computer to calculate a total number of elements in a second dataset managed by a second party;
  prohibiting each party access to each other's dataset;
  ranking the elements within each dataset;
  using the first computer to compute a total number of elements [$\Sigma l_i$] in the first dataset having a value less than a test value [m] and using the second computer to compute a total number of elements [$\Sigma l_i$] in the second dataset, within each dataset each having a value less than the test value without exchanging a number of elements [$l_i$] with each dataset between the two computers;
  using the first computer to compute a total number of elements [$\Sigma g_i$] in the first dataset having a value greater than the test value [m] and using the second computer to compute a total number of elements [$\Sigma g_i$] in the second dataset having a value greater than the test value; and
  for each of the first and second computers, using the computer to set the value [V] of the element, having the k-th rank [k], equal to the test value [m], if the total number of elements having values less than the test value [$\Sigma l_i$] is ≤ the k-th rank [k] minus one, and the total number of elements having values greater than the test value [$\Sigma g_i$] is ≤ the total number of elements [T] minus the k-th rank [k].

14. The article of claim 13, the at least one computer-readable storage medium storing instructions that when executed by at least one of the first and second computers, cause the at least one of the first and second computers to:
  define a search range having a lower limit and an upper limit;
  set the upper limit of the search range equal to the test value [m], if the total number of elements having values less than [$\Sigma l_i$] the test value [m] is greater than or equal to the k-th rank [k];
  select a next test value from within the search range; and
  repeat using the first and second computers to compute and set using the next test value.

15. The article of claim 13, the at least one computer-readable storage medium storing instructions that when executed by at least one of the first and second computers, cause the at least one of the first and second computers to:
  define a search range having a lower limit and an upper limit;
  set the lower limit of the search range to the test value [m], if the total number of elements having values greater than [$\Sigma g_i$] the test value [m] is ≥ the total number of elements [T] minus the k-th rank [k] plus one;
  select a next test value form within the search range; and
  repeat using the first and second computers to compute and set using the next test value.

16. A system for determining a value [V] of an element, having a k-th rank [k], where [k] is a pre-selected number, comprising:
  computer means for calculating a total number of elements [T] in a first dataset managed by a first party, and a second dataset managed by a second party;
  computer means for prohibiting each party access to each other's dataset;
  computer means for ranking the elements within each dataset;
  computer means for computing a total number of elements [$\Sigma l_i$] in the datasets each having a value less than a test value [m], without exchanging a number of elements [$\Sigma l_i$] within each dataset each having a value less than the test value;
  computer means for computing a total number of elements [$\Sigma g_i$] in the datasets each having a value greater than the test value [m], without exchanging a number of elements [$g_i$] within each dataset each having a value greater than the test value; and
  computer means for setting the value [V] of the element, having the k-th rank [k], equal to the test value [m], if the total number of elements having values less than the test value [$\Sigma l_i$] is ≤ the k-th rank [k] minus one, and the total number of elements having values greater than the test value [$\Sigma g_i$] is ≤ the total number of elements [T] minus the k-th rank [k].

17. The system of claim 16, further comprising:
  computer means for defining a search range having a lower limit and an upper limit;
  computer means for setting the upper limit of the search range equal to the test value [m], if the total number of elements having values less than [$\Sigma l_i$] the test value [m] is greater than or equal to the k-th rank [k];

computer means for selecting a next test value from within the search range; and computer means for repeating the computing and setting steps using the next test value.

18. The system of claim 16, further comprising:

computer means for defining a search range having a lower limit and an upper limit;

computer means for setting the lower limit of the search range equal to the test value [m], if the total number of elements having values greater than [$\Sigma g_i$] the test value [m] is ≥ the total number of elements [T] minus the k-th rank [k] plus one;

computer means for selecting a next test value from within the search range; and computer means for repeating the computing and setting steps using the next test value.

\* \* \* \* \*

UNITED STATES PATENT AND TRADEMARK OFFICE
CERTIFICATE OF CORRECTION

PATENT NO.       : 8,738,387 B2  
APPLICATION NO.  : 10/976558  
DATED            : May 27, 2014  
INVENTOR(S)      : Gagan Aggarwal et al.

Page 1 of 1

It is certified that error appears in the above-identified patent and that said Letters Patent is hereby corrected as shown below:

In the Claims

In column 11, line 1, in Claim 12, after "value" insert -- [V] --.

In column 11, line 1, in Claim 12, after "an" delete "[V]".

In column 12, line 49, in Claim 16, delete "[$\Sigma l_i$]" and insert -- [$l_i$] --, therefor.

Signed and Sealed this
Thirtieth Day of September, 2014

Michelle K. Lee
*Deputy Director of the United States Patent and Trademark Office*